United States Patent
Osborn et al.

(10) Patent No.: US 6,366,199 B1
(45) Date of Patent: Apr. 2, 2002

(54) METHOD AND APPARATUS FOR MEASURING AND ACCUMULATING CRITICAL AUTOMOBILE WARRANTY STATISTICAL DATA

(75) Inventors: Brock Estel Osborn, Schenectady; John Erik Hershey, Ballston Lake; Kenneth Brakeley Welles, Scotia; Russell Robert Irving; Nick Andrew Van Stralen, both of Ballston Lake, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/497,937

(22) Filed: Feb. 4, 2000

(51) Int. Cl.[7] ............................................. B60Q 1/00
(52) U.S. Cl. .................... 340/438; 340/439; 701/29; 701/35
(58) Field of Search ................. 340/438, 439; 701/29, 30, 31, 33, 34, 35

(56) References Cited

U.S. PATENT DOCUMENTS

| | | | | |
|---|---|---|---|---|
| 5,311,430 A | * | 5/1994 | Ishigami | 701/35 |
| 5,325,082 A | * | 6/1994 | Rodriguez | 701/35 |
| 5,350,076 A | * | 9/1994 | Kalan | 701/35 |
| 5,446,659 A | * | 8/1995 | Yamawaki | 701/35 |
| 5,450,321 A | * | 9/1995 | Crane | 701/35 |
| 5,479,350 A | * | 12/1995 | Barakchi et al. | 701/35 |
| 5,600,558 A | * | 2/1997 | Mearek et al. | 701/35 |
| 5,642,284 A | * | 6/1997 | Parupalli et al. | 701/30 |
| 5,857,159 A | * | 1/1999 | Dickrell et al. | 701/35 |

* cited by examiner

*Primary Examiner*—Daryl Pope
(74) *Attorney, Agent, or Firm*—David C. Goldman; Jill M. Breedlove

(57) ABSTRACT

A system is provided for monitoring operating parameters relating to vehicle usage and using the operating parameter information to derive warranty statistical data. In one embodiment, an operating parameter monitoring unit includes a microprocessor and a sensor interface mounted within a housing. The sensor interface includes a number of leads for receiving sensor input signals from sensors that monitor various vehicle operating parameters. The microprocessor receives parameter information via the sensor interface that is indicative of various input sensor signals and stores corresponding parameter information in memory. The stored parameter information can be accessed via a data interface such as a data port or a RF interface.

12 Claims, 3 Drawing Sheets

METHOD AND APPARATUS FOR MEASURING AND ACCUMULATING CRITICAL AUTOMOBILE WARRANTY STATISTICAL DATA

BACKGROUND OF THE INVENTION

The present invention relates in general to maintenance and risk assessment systems and, in particular, to a method and apparatus for measuring one or more vehicle operating parameters based on actual vehicle use, and for accumulating and processing such information to yield critical automobile warranty statistical data.

Maintenance and risk assessment systems are used in a variety of business and other private and public contexts. Generally, an important objective of such systems is to analyze certain activities based on identifiable correlations between selected variables and related maintenance and risk factors. Such correlations can be useful in scheduling maintenance and assessing the risk associated with the activity under consideration so that a determination can be made, for example, as to whether to undertake/allow the activity and/or how to allocate the risk such as through risk-based pricing or establishment of appropriate warranty terms.

The case of the automobile warranty business is illustrative. Warranties are often provided, for example, in connection with automobile purchases. Indeed, the availability of such warranties, and the resulting certainty in overall vehicle use costs, is a significant factor for inducing some consumers to purchase an automobile. In this regard, the warranty may specify that a manufacturer, an underwriter, or some other related party will pay to repair or replace the vehicle under certain circumstances. Such warranties obviously increase costs to the warrantor and this increased cost is generally ultimately reflected in purchase prices, as a separate pricing item or otherwise. Accordingly, both the warrantor and purchaser have an interest in reducing vehicle wear costs and in monitoring the costs.

In order for the contract prices to reflect true operating expenses, as may be considered most equitable or sensible, it is desirable to accurately assess the risk associated with a given contract or type of contract. To this end, the warranty cost may be determined by identifying variables associated with a particular contract that correlate to particular risk factors. In the automobile warranty business, examples of such variables include: the make and model of the vehicle, the climate and terrain in which the vehicle is used, the driving habits of the vehicle drivers, etc. Examples of risk factors include the frequency and cost for repair/replacement associated with particular types of damage. Thus, for example, a contract price for a particular class of vehicle having higher historical repair costs may reflect such higher costs as a warranty item or otherwise. Similarly, vehicles may be scheduled for more or less frequent maintenance depending on climate or driving conditions.

Conventionally, the process for identifying such variable/risk factor correlations involves postulating such a correlation, obtaining data relating to the relevant variable and risk factor, and analyzing the data to confirm, quantify and/or refute the postulation. The initial step of postulating a correlation is often based on the professional experience of an analyst. Postulations are often based on anecdotal information or third party studies, e.g. Consumer Reports studies for a particular make and model of vehicle. Based on such a postulation, the analyst may acquire data, for example, by accessing a database of archived records for relevant car vehicles and claims. This data may then be provided to a computer system programmed to execute conventional risk analysis routines. The computer system can then conduct an analysis and provide an output that the analyst can use to confirm, quantify or refute the postulation.

It will be appreciated that there are significant limitations on the types of analyses that can be conducted based on archived claim records. In particular, such records generally provide useful aggregated information for trending analysis and the like, but generally provide little or no data correlating specific vehicle usage patterns to associated claims.

SUMMARY OF THE INVENTION

It is therefore desirable to measure and accumulate operating parameter information based on vehicle usage and for analyzing the resulting information to yield critical automobile warranty statistical data. The present invention provides valuable information regarding vehicle usage patterns that can improve risk assessment and allow for improved warranty contract management.

In accordance with one aspect of the present invention, an apparatus is provided for use in monitoring one or more operating parameters related to vehicle wear. The apparatus includes a support structure such as a frame or housing for interconnection to the vehicle such that the support structure is carried by the vehicle during operating, and a sensor for monitoring a first operating parameter and providing a sensor signal indicative of the first operating parameter. The support structure can be attached to an interior or exterior portion of the vehicle. The sensor may sense any of various parameters such as a current (e.g., related to operation of a brake light, a starter solenoid, an air conditioner clutch or headlight), a thermal value, (e.g., heat related to air entering a radiator, or heat related to operation of an engine, air conditioner compressor or air condition condenser), an acceleration value (e.g., related to a forward or braking acceleration, a vertical component of acceleration or side-to-side acceleration) or an induction related value (e.g., an inductance related to operation of a spark plug). The support structure carries a processor for receiving information based on the sensor signal and for processing the information to generate processed information. The apparatus further includes a memory structure associated with the processor for storing the processed information, a first interface structure for interfacing the memory structure with the processor and a second interface structure for use in accessing the processor so as to retrieve the processed information from the memory structure for use by an external processing system. The second interface may include, for example, an output port for use in downloading the processed information or a data port for interfacing with a wireless communications device, for example, a cordless telephone.

In accordance with another aspect of the present invention, multiple operating parameters are monitored to obtain composite parameter information. It has been recognized that certain vehicle wear characteristics can be more meaningfully monitored by concurrently tracking combinations of operating parameters. For example, to analyze brake wear, it may be useful to monitor a brake application event in conjunction with a duration of the event and/or an operating speed of the vehicle. The associated process includes the steps of: mounting an electronics unit on a vehicle, where the electronics unit includes a first sensor for monitoring a first operating parameter and a second sensor for monitoring a second operating parameter; monitoring the first parameter during a first time period to obtain first parameter information; monitoring the second parameter during the second time period to obtain second parameter information where the first and second time periods overlap; and analyzing the first parameter information in conjunction with the second parameter information to obtain automobile warranty statistical data. In this manner, multivariate analyses can be performed to improve warranty data.

According to another aspect of the present invention, a method is provided for analyzing monitored operating parameter information to obtain warranty statistical data. The method involves downloading parameter information from a database including operating parameter information obtained by monitoring one or more operating parameters during vehicle use and applying a statistical tool to the operating parameter information to derive a mathematical model for characterizing the parameter information. The mathematical model may comprise, for example, a repairable system model. The method may further include the step of comparing the resulting mathematical model to empirical data to confirm the predictive quality of the model.

BRIEF DESCRIPTION OF THE DRAWINGS

For a more complete understanding of the present invention and further advantages thereof, reference is now made to the following detailed description taken in conjunction with the drawings, in which.

DETAILED DESCRIPTION

The following description sets forth the invention in the context of a system for monitoring operating parameters relating to vehicle usage and using the operating parameter information to derive warranty statistical data. A monitoring unit for mounting on a vehicle is first described. Thereafter, various mathematical models are described to illustrate possible usages of the monitored parameter information. Finally, a process for obtaining and using monitored parameter information is provided by way of summary.

Figure 1:
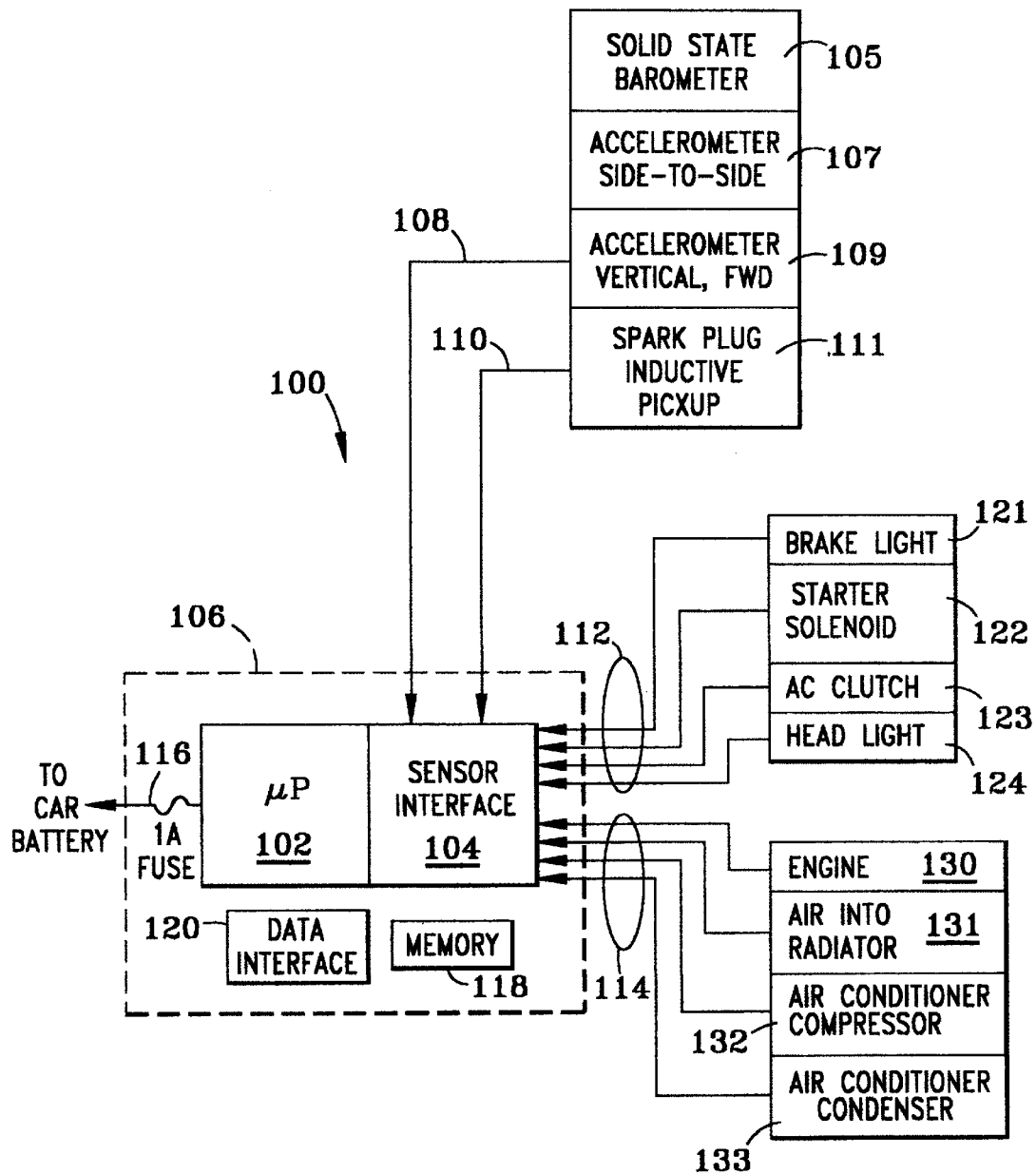
FIG. 1 is a block diagram illustrating an operating parameter monitoring the unit in accordance with the present invention.

Referring to FIG. 1, an operating parameter monitoring unit is generally identified by the reference number 100. The unit 100 generally includes a microprocessor 102 and a sensor interface 104 mounted within a housing 106. The sensor interface 104 includes a number of leads 108, 110, 112 and 114 for receiving sensor input signals from sensors 105, 107, 109, 111, 121–124 and 130–133 that monitor various vehicle operating parameters and will be described in more detail below. The housing 106 allows for mounting of the unit 100 on a vehicle so as to monitor operating parameters during vehicle use. In this regard, the unit 100 may be mounted on an exterior portion of the vehicle such as a vehicle chassis or on an interior portion of the vehicle such as under the vehicle dashboard. The unit 100 can be powered by the vehicle battery. In the illustrated embodiment, the unit 100 is connected to the car battery by way of a lead 116 associated with a fuse such as a one ampere fuse. The housing 106 preferably encloses the microprocessor and sensor interface to protect these components in an operating environment that may be quite rugged.

A variety of different operating parameters may be monitored in accordance with the present invention. The illustrated unit 100 shows a number of examples in this regard. As shown, lead 108 is associated with one or more accelerometers 107, 109 and a solid state barometer 105. Alternatively, accelerometers and/or a barometer may be incorporated into the microprocessor system. The accelerometers 107, 109 may sense an acceleration relative to a forward travel direction of the vehicle or relative to vertical as well as side-to-side acceleration. For example, an accelerometer may monitor a negative acceleration relative to a forward direction of travel associated with braking. Such an acceleration may provide an indication of applied braking force that may be of interest in relation to brake wear. A positive forward acceleration may be of interest in relation to engine wear. A side-to-side acceleration may be of interest in relation to tire wear, CV joint wear, etc. Changes in the output of a solid state barometer 105 provide an indication of the hilliness of the operating environment of the vehicle which may be related to various types of vehicle wear.

The illustrated lead of 110 is associated with an inductive pickup 111 for monitoring spark plug operation. For example, the inductive pickup 111 may be clamped onto a spark plug wire. In this manner, the lead 110 provides information relating to the rate of spark plug firing. This, in turn, provides a direct indication of a rate of engine operation which may be of interest in relation to engine wear, brake wear, or other elements of vehicle wear.

The leads 112 illustrate a variety of possible current sensor inputs. Such current sensors may include, for example, Hall effect sensors. Current is a convenient parameter to monitor in relation to usage patterns for many vehicle systems. For example, a current sensor may be associated with a brake light circuit 121 to provide an indication of brake light usage and associated brake usage. A current sensor may also be associated with a starter solenoid circuit 122 to provide an indication of starter usage and vehicle startup events. A further current sensor may be associated with an air conditioning system clutch circuit 123 to provide an indication of air conditioning usage. Headlight usage may also be monitored by associating a current sensor with a headlight circuit 124. Headlight usage may be monitored in order to provide direct information related to headlight wear or to provide information regarding possible nighttime vehicle usage which may be relevant in analyzing other wear or risk factors.

It may also be desirable to monitor various thermal values related to certain vehicle operation parameters. The illustrated leads 114 provide input signals from various possible thermal sensors 130–133. These thermal sensors may include, for example, thermistors. In this regard, the illustrated 130 provides an indication of engine heat. Such engine heat may indicate that the engine is operating and may also provide an indication of the engine operating temperature. Sensor 131 provides an input regarding the temperature of air received at the radiator. This may be used to provide feedback regarding actual ambient operating temperature. Sensor 132 is associated with an air conditioning compressor circuit to provide feedback regarding air condition usage. Similarly, thermal sensor 133 is associated with an air conditioning condenser circuit in order to provide information regarding air conditioning usage patterns.

Other types of sensors may be employed. For example, a voltage sensor may be provided via a simple hookup to the vehicle battery to provide information regarding electrical system usage. In addition, information regarding any of the above noted parameters may be gathered in conjunction with timing information. For example, a statistician may be interested not only in events of brake usage as indicated by a brake light signal, but also in duration of braking events. In this regard, the brake light sensor information may be correlated to timing information derived from a system clock (not shown).

In the illustrated embodiment, the various sensors noted above are interconnected to a sensor interface 104. The sensor interface 104 receives the sensor signals and provides corresponding data to the microprocessor 102. In this regard, the sensor interface may include amplifier circuitry, analog to digital converter circuitry and other signal processing circuitry as appropriate.

The microprocessor 102 is useful for storing and providing access to operating parameter information. In this regard, the microprocessor 102 receives parameter information via the sensor interface 104 that is indicative of various input sensor signals. For example, information corresponding to different sensors may be input to the microprocessor 102 via separate bit lines. The microprocessor 102 processes this input information and stores corresponding parameter information in memory 118. The information stored in memory may be of various types. For example, information regarding a braking event may include a starting time of the event and an ending time of the event. Information regarding an engine temperature may include a temperature value and, if desired, a corresponding time or duration associated with the temperature value. In addition, related operating parameter information may be coprocessed and stored in a single file or in a relational database, e.g., a braking event indicated by a brake light sensor may be associated with an engine operation speed as indicated by a spark plug sensor 111. Any suitable form of memory 118 may be used in this regard. The microprocessor 102 also allows access to the stored parameter information via the data interface 120. Various types of interfaces are possible. For example, the data interface 120 may include a data port such that information from memory 118 can be downloaded to an exterior computer system via the data port. For example, from time-to-time, the vehicle may be brought to a service center. At the service center, a cable can be interconnected to the data port such that an operator using a user interface associated with an external computer system can access and download parameter information from memory 118.

As another example, the data interface may be associated with a cordless phone with this interface, for example, as a vehicle is brought into a service center, the parameters information may be downloaded automatically to the service center's computer system. With the parameter date, the service agent will be able to recommend the appropriate servicing actions to the customer.

Various other types of data interfaces 120 may be employed. For example, the data interface 120 may be associated with a cellular phone or other wireless data terminal. In this manner, data can be downloaded from memory 118 to an external computer system via an RF interface, e.g., using a wireless Internet interface. Such a wireless interface may be desirable as it allows access to the parameter information without requiring that the vehicle report to a service center. Based on the foregoing, it will be appreciated that a variety of monitored operating parameter information may be made available for statistical analysis.

Recent analysis of claim data associated with auto warranty insurance studies has indicated that automobile claims may be very successfully statistically modeled in the context of repairable systems. The key element of damage inducing wear on a particular vehicle component is expected to be directly related to the total use of that component since installation or last repair. For example, a vehicle's claim history may be modeled in terms of a Repairable System Model. Using maximum likelihood methods on certain warranty contracts, it has been found that the joint probability density function, $f(\cdot)$, that an automobile observed over the mileage interval (a, b) will have N failures at mileages $$a < t_1 < t_2 < \ldots < t_N < b$$

is given by $$f(t_1 t_2, \ldots, t_N) = \exp\left[-\left(\frac{b}{47552}\right)^{1.58} + \left(\frac{a}{47552}\right)^{1.58}\right] \times \prod_{i=1}^{N}\left(\frac{1.58}{47552}\right)\left(\frac{t_i}{47552}\right)^{0.58}$$

Figure 2:
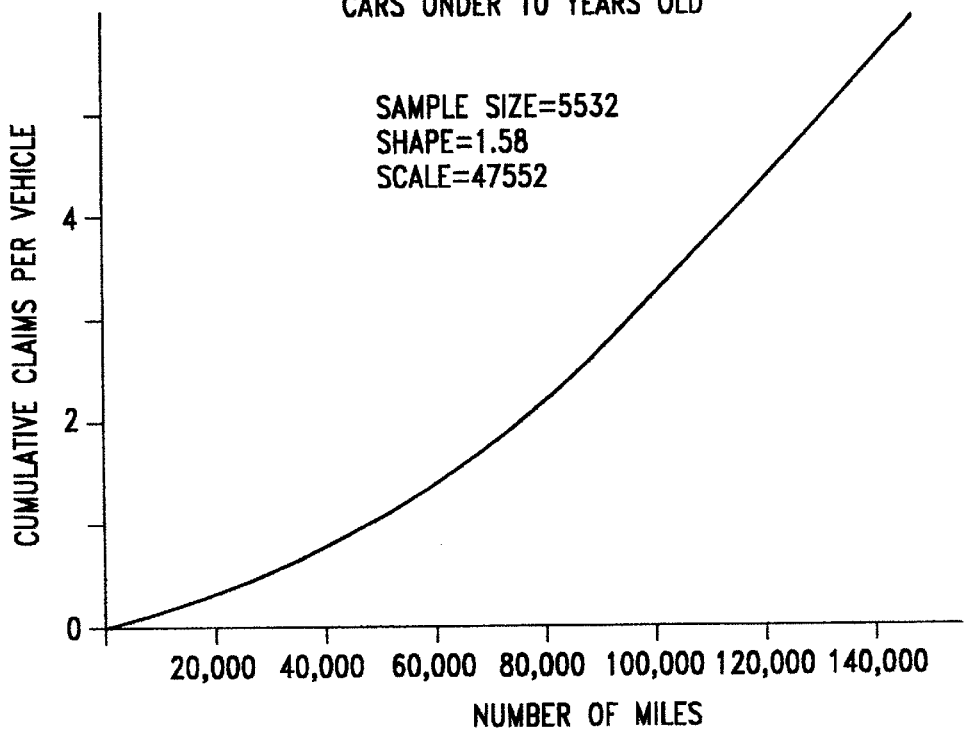
FIG. 2 is a graph illustrating the relationship of cumulative claims per vehicle to number of vehicle miles.

The resulting predicted and actual cumulative number of claims per vehicle is shown in FIG. 2. Chi-squared goodness of fit tests reveal that this fit is excellent. Similar results also exist for predicting claims based on age of vehicle.

The amount of use of a component may, in some cases be tied to environmental factors. For example, the category of Interior Climate and Comfort subsumes air conditioning. It has been found that air conditioning claims track average maximum temperature of the operating environment. Presumably, this environmental factor is indirectly linked to component failure through the vehicle's operator whose air conditioner usage similarly tracks the average maximum temperature. Considering just the normal monthly maximum daily temperature, $T_i$, it has been found that it can be well modeled by a sine wave, in particular, $$T_i = \frac{T_{min} + T_{max}}{2} - \frac{T_{min} - T_{max}}{2}\cos\left(2\pi\frac{i}{12}\right)$$

where i is the month. For January, i=0; for December, i=11, $T_i$ is the normal maximum daily temperature for the i=th month.

$T_{min}$ is the minimum of the normal maximum daily temperatures.

$T_{max}$ is the maximum of the normal maximum daily temperatures.

Figure 3:
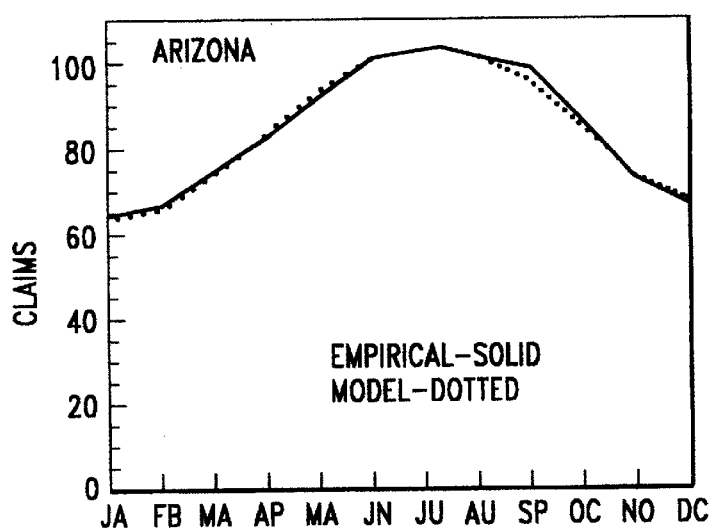
FIG. 3 is a graph illustrating the correlation between a mathematical model and empirical data for local temperature.
Figure 4:
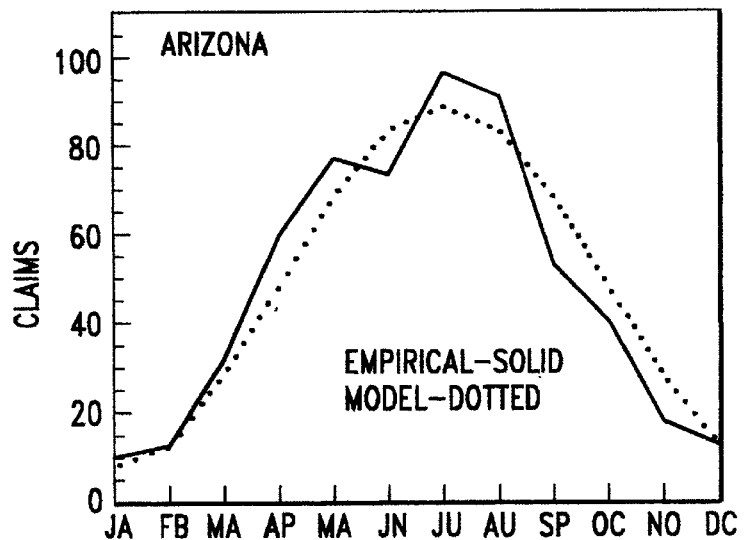
FIG. 4 is a graph illustrating a correlation between a mathematical model and empirical data for air conditioning claims.

FIG. 3 demonstrates the suitability of this simple model with measured values for the state of Arizona. Making the next step, it is postulated that the estimated number of claims $\hat{C}_i$ for 24×24 closed contracts in the i-th month can be modeled as $$\hat{C}_i = a + b\left[\frac{T_{min} + T_{max}}{2} - \frac{T_{min} - T_{max}}{2}\cos\left(2\pi\frac{i}{12}\right)\right]$$

where a and b are constants which will be a function of the specific state. For Arizona, a least squares fit gives a=119.894 and b=1.97383. FIG. 4 demonstrates the validity of the seasonality model for this particular component for this particular state. The fit is quite good with $R^2$=0.922.

Based on the foregoing, it would be appreciated that, in order to test some of these suspected linkages and in anticipation of further developing some low cost and efficient measurement techniques, that may be used to better manager vehicle availability through predictive maintenance programs, the monitoring unit of the present invention can be used to monitor critical time of use data.

As will be appreciate from the discussion above, various electrical signals may be of interest. These include:

1. Ignition key lock (on/off)
2. Air conditioner (on/off)
3. Brakes applied (yes/no—the switch for the brake lights)
4. The speedometer.

It may be desirable to analyze these signals in relation to a time parameter. For items 1 and 2 above, a simple elapsed timer may be sufficient. For item 3, an elapsed timer is one option that may be provided, but there are two additional options that may be useful.

The first additional option is an elapsed timer that measures applied braking only if the vehicle's speed is non-zero, i.e., the brakes are not being applied simply to hold the car still. The second additional option is an integrator which measures $$\int b(t) \cdot speed \cdot dt$$

where:

b(t) is the 'Brakes Applied' signal and $$b(t) = \begin{cases} 0, & brakes\,not\,applied \\ 1, & brakes\,applied \end{cases}$$

speed is the vehicle's speed.

This latter additional option would be even more useful than the first additional option for assessing brake wear. It is expected that this integral will be related to the environmental variables of $Log_{10}$ (Population) (Pop) and Hilliness, the mean of the absolute value of the first derivative of elevation measured over a standard city area with a standard grid.

Figure 5:
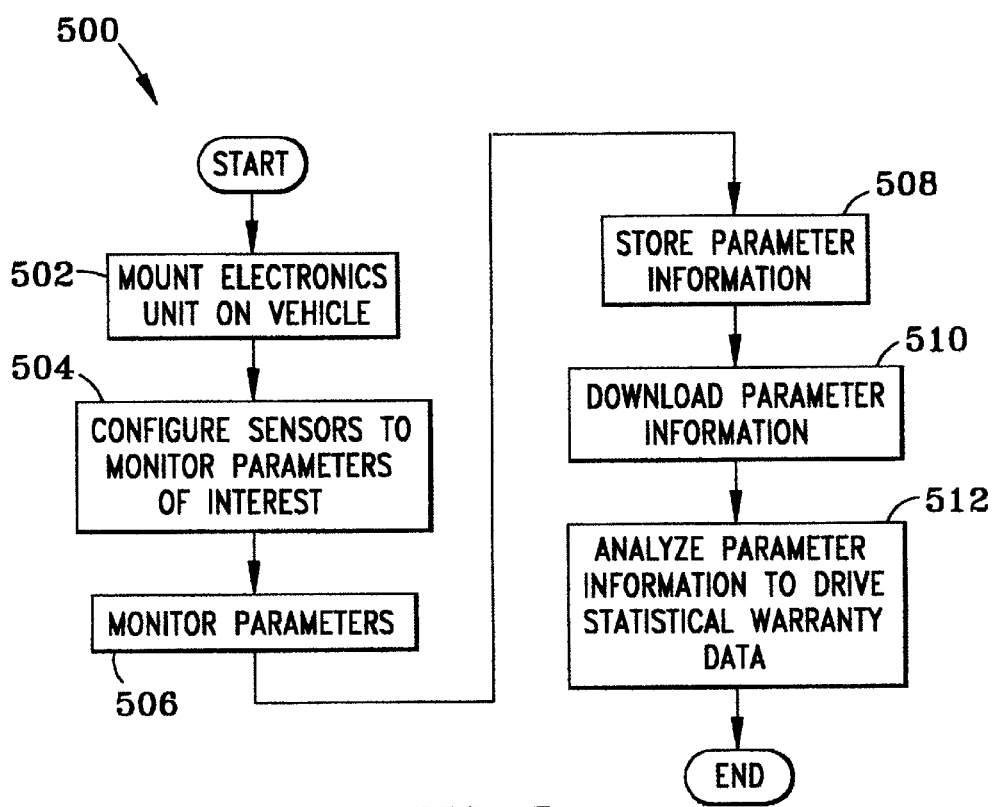
FIG. 5 is a flow chart illustrating a process for deriving warranty statistical data in accordance with the present invention.

The operation of the present invention in this regard may be summarized by reference to the flow chart of FIG. 5. In particular, FIG. 5 illustrates a process 500 for obtaining and using operating parameter information to derive statistical warranty data. The process 500 is initiated by mounting 502 an electronics unit on a vehicle. The electronics unit preferable includes multiple sensors to monitor multiple operating parameters as discussed above. The sensors are then configured 504 to monitor parameters of interest. For example, inductive hookups may be clipped to any one of the spark plug wires current sensors such as Hall effect sensors may be clipped to the associated vehicle structure, a voltage sensor may be hooked up to the battery and thermistors may be positioned on the associated vehicle elements as desired. Some sensors such as the accelerometers may be provided as solid state devices located in the microprocessor box and do not necessarily require any special configuration.

The process 500 further involves monitoring 506 the parameters during vehicle use and storing 508 the parameter information in memory. The parameter information can then be downloaded 510 by way of a data port, RF interface or other mechanism. The downloaded parameter information can then be analyzed 512 to derive statistical warranty data.

Such analysis may involve use of a repairable system model to derive predictive wear information. Such wear information can be used for example to schedule maintenance so as to improve vehicle availability or in establishing costs in connection with warranty contracts.

While various embodiments of the present invention have been described in detail, it is apparent that further modifications and adaptations of the invention will occur to those skilled in the art. However, it is to be expressly understood that such modifications and adaptations are within the spirit and scope of the present invention.

What is claimed is:

1. A method for use in measuring and accumulating warranty statistical data, comprising the steps of:

mounting an electronics unit on a vehicle, said electronics unit including a first sensor for monitoring a first operating parameter, a processor for receiving input information regarding said monitored first operating parameter and processing said input information to yield processed operating parameter information and a memory for storing at least a portion of said processed operating parameter information;

accessing said electronics unit to download said stored processed operating parameter information for use by an external processing system; and using said external processing system to derive warranty statistical data, wherein said using comprises applying a statistical tool to said processed operating parameter information to derive a mathematical model for characterizing said processed operating parameter information.

2. A method as set forth in claim 1, wherein said step of mounting comprises attaching said electronics unit to a surface of said vehicle and positioning said first sensor so as to monitor said first operating parameter.

3. A method as set forth in claim 1, wherein said step of accessing comprises interfacing a cable terminal with an output port of said electronics unit.

4. A method as set forth in claim 1, wherein said step of accessing comprises establishing communication between said electronics unit and a wireless communications unit.

5. A method as set forth in claim 1, wherein said mathematical model comprises a repairable system model.

6. A method as set forth in claim 1, further comprising the step of comparing said mathematical model to empirical data.

7. A method as set forth in claim 1, wherein said electronics unit further comprises a second sensor for monitoring a second operation parameter and said method further comprises:

monitoring the first operating parameter during a first time period to obtain first parameter information; and monitoring the second operating parameter during a second time period to obtain second parameter information; where the first and second time periods overlap; and said step of using comprises analyzing said first parameter information in conjunction with said second parameter information to obtain said warranty statistical data.

8. A system for monitoring one or more operating parameters related to vehicle wear and deriving warranty statistical data therefrom, comprising:

a vehicle operating parameter monitoring unit that monitors one or more operating parameters of a vehicle; and a warranty statistical data processor, coupled to the vehicle operating parameter monitoring unit, that uses the one or more operating parameters to generate auto warranty statistical data for the vehicle, wherein the warranty statistical data processor applies a statistical tool to the one or more monitored operating parameters to derive a mathematical model that characterizes the parameters.

9. The system according to claim 8, wherein the vehicle operating parameter monitoring unit comprises a plurality of sensors that measure vehicle operating parameters.

10. The system according to claim 8, wherein the vehicle operating parameter monitoring unit comprises a data interface that communicates the one or more monitored operating parameters to the warranty statistical data processor.

11. The system according to claim 8, wherein the mathematical model comprises a repairable system model.

12. The system according to claim 11, wherein the warranty statistical data processor uses the repairable system model to generate predictive wear information and maintenance information for the vehicle.

* * * * *